United States Patent
Song et al.

(10) Patent No.: US 8,374,352 B2
(45) Date of Patent: Feb. 12, 2013

(54) CONTEXT-FREE PROTOCOL FOR ENFORCING DATA FORWARDING IN WIRELESS AD HOC NETWORKS

(75) Inventors: Chengqi Song, Hong Kong (CN); Qian Zhang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 649 days.

(21) Appl. No.: 12/422,722

(22) Filed: Apr. 13, 2009

(65) Prior Publication Data

US 2010/0260337 A1  Oct. 14, 2010

(51) Int. Cl.
*H04K 1/00* (2006.01)
(52) U.S. Cl. .................. 380/270; 713/160; 713/171
(58) Field of Classification Search .............. 380/30, 380/33, 259, 270; 713/171, 160
See application file for complete search history.

(56) References Cited

U.S. PATENT DOCUMENTS

| | | | | |
|---|---|---|---|---|
| 2005/0165696 | A1* | 7/2005 | Jakobsson et al. | 705/65 |
| 2006/0167784 | A1* | 7/2006 | Hoffberg | 705/37 |
| 2009/0086663 | A1* | 4/2009 | Ho et al. | 370/328 |
| 2010/0317420 | A1* | 12/2010 | Hoffberg | 463/1 |

OTHER PUBLICATIONS

Michael Weeks and Gulsah Altun, Efficient, Secure, Dynamic Routing for Ad-hoc Networks; 2006.*
Marti et al., "Mitigating Routing Misbehavior in Mobile Ad Hoc Networks," 2000, pp. 255-265, Mobicom, Boston, Massachusetts.
Jaramillo et al., "DARWIN: Distributed and Adaptive Reputation mechanism for Wireless ad-hoc Networks," Mobicom '07, Sep. 9-14, 2007, pp. 87-97, Mobicom, Montreal, Canada.
Song et al., "COFFEE: A context-free protocol for enforcing data forwarding in wireless ad hoc networks," presented at *SECON: 5th Annual IEEE Communications Society Conference on Sensor, Mesh and Ad Hoc Communications and Networks* (Rome, Italy, Jun. 24, 2009).

* cited by examiner

*Primary Examiner* — Samson Lemma
(74) *Attorney, Agent, or Firm* — Leydig, Voit & Mayer, Ltd.

(57) ABSTRACT

Described herein is a context-free protocol (i.e., the COFFEE protocol) for stimulating cooperation among selfish nodes. Various embodiments have the ability to transmit a packet over the path successfully without the dependency on the information of other packets' transmissions. It is assumed that every node in the network is rational, and therefore during the packet forwarding stage, if the intermediate nodes can not clearly tell whether the packet is destined to them or not, they do not simply drop the packet. Thus, in the COFFEE protocol, by introducing several techniques, for a packet received by a node, the node thinks the packet could potentially be destined to itself and forwards the packet to find out the answer. Detailed analysis and performance evaluations have been conducted to demonstrate the effectiveness of the COFFEE protocol.

17 Claims, 5 Drawing Sheets

CONTEXT-FREE PROTOCOL FOR ENFORCING DATA FORWARDING IN WIRELESS AD HOC NETWORKS

TECHNICAL FIELD

The present invention relates to the field of computer networking in general and to a method for enforcing data forwards in wireless ad hoc networks.

BACKGROUND OF THE INVENTION

An ad hoc network is a group of wireless nodes that cooperatively form a network independent of fixed infrastructure or centralized administration. In the absence of a fixed infrastructure, nodes in ad hoc networks cooperate to provide routing services, relying on each other to forward packets to their destination. Since there is no centralized control to enforce cooperation, and devices in an ad hoc network may belong to different authorities such as different persons, wireless nodes may attempt to be selfish and unwilling to spend their own bandwidth and battery power in forwarding packets for other users. This is a fundamental problem for ad hoc networks and has been attracting researchers' interests since ad hoc network was first introduced.

Since the problem of selfish nodes is very fundamental to ad hoc networks, many research works have been conducted on stimulating cooperation among non-cooperative nodes for data forwarding. Those works basically can be divided into two categories: reputation based and credit-exchange based.

In reputation based solutions, network nodes monitor other nodes' behaviors and make a reputation for one another. If a node is selfish, for example, dropping other nodes' packets, it will get a bad reputation and be isolated by other nodes. These solutions usually require network nodes to propagate second-hand reputation information, so the secured reputation propagation incurs a new security problem in the existing systems. Another serious issue is that these systems generally cannot prevent colluding to cheat.

In credit-exchange based solutions, nodes are paid with credits each time when they forward a packet for others. If a selfish node doesn't forward packets for others, it has no credit to pay others for sending its own data. Such solution requires systems such as the virtual bank to manage the exchange of credits, which can be very complex. Some existing works even use tamper-proof hardware module to secure credit information. Moreover, after a node gains enough credits for transmitting its own data, it can start to drop others' packets.

Although the above two types of solutions appear quite different from each other, their basic ideas are similar: building a context for recording and tracking nodes' behaviors, evaluating whether a node is selfish in terms of the cumulated reputation or credit, and punishing the selfish nodes. These solutions are context-based solutions, which depend on continuously tracking the behaviors of all the network nodes for forwarding the packets among multiple traffic flows. In addition, context-based solutions rely on accurate identification of selfish behaviors, securely maintaining the context, and appropriately punishing the selfish nodes. Although many context-based systems have been proposed, none of them is able to completely meet all these requirements. Moreover, isolating selfish nodes after identifying them is an inefficient way for solving the selfish node problem, since a longer transmission path will likely have to be used in order to bypass the selfish nodes.

Unlike context-based protocols that rely on information collected from transmissions of other packets, the network nodes in context-free protocols are able to transmit a packet over a path without relying on the transmissions of other packets. Such a protocol has significant advantages over context-based ones. Firstly, context-free protocols only rely on a single packet to make transmission decision over multiple hops. They are not required to maintain and secure context information, and therefore avoid all the issues caused by the context maintenance. Secondly, context-free protocols are not required to track all the packets and check context information, and therefore operate immediately when a packet is transmitted. Thirdly, context-free protocols are not required to obtain the information of other traffic flows, and therefore function well with any traffic pattern.

Existing context-free protocols, however, are very vulnerable to colluding and flow analysis attacks. In addition, the designs of existing context-free protocols result in high latency and are likely to cause problems to latency-sensitive network transmissions such as TCP. Therefore, it is desired to design a context-free protocol for ad hoc network to stimulate and encourage data forwarding among a plurality of network nodes, wherein the protocol is robust and not subject to colluding and flow analysis attacks.

SUMMARY OF THE INVENTION

In the description herein, it is assumed that the wireless network nodes are still rational and want to have their own packets delivered and received successfully. They have the selfish behaviors mainly because they want to save resource such as bandwidth and battery power. These selfish network nodes are different from malicious nodes, who intend to damage other nodes and even the entire network. In addition, the method and system described herein address the problem of selfish node behaviors during data forwarding, but not route discovery. The protocol described herein does not have special requirements on route discovery and can generally work well with the solutions provided to enforce cooperation during route discovery.

According to one embodiment, a network protocol is provided for stimulating data forwarding among multiple nodes in a context-free way. Without maintaining the context of the packet transmission history, the information available for deciding packet forwarding in the context-free protocol is limited to the packet that is currently being transmitted. As assumed earlier, every node in the network is rational and wants to receive their desired packets. Thus, during packet forwarding stage, if the intermediate nodes cannot clearly tell whether the packet is destined to them or not, they will not simply drop the packet since the destination could be anyone of them, including itself. The properties the context-free protocol described here is summarized as follows:

(1) During the packet forwarding stage, the identity of the destination should be hidden to all nodes, including all the intermediate nodes and the destination node;

(2) The destination node should also be involved in packet forwarding and is required to forward the packet; and (3) The identity of the packet destination can only be revealed after all nodes forward the packet cooperatively.

According to another embodiment, a context-free protocol named COFFEE (COntext-FrEE) is provided, wherein the three properties mentioned above are satisfied. The COFFEE protocol includes:

(1) The source node removes the information about route path and destination when sending a packet. Therefore the identity of destination is hidden to receiving nodes.

(2) The packet arrives at its destination twice before the transmission ends. As a result the destination node is also involved in the transmission of the packet.

(3) The source node encrypts the packet with a secrete key; the key is also encrypted and can only be revealed when the entire transmission process is done. With this mechanism the identity of destination can only be revealed after all forwarding is finished.

According to some embodiments, a method for enforcing data forwarding in a wireless ad hoc network, the method comprising (1) encrypting data in a data packet based on a key; (2) encrypting the key based on a plurality of node keys; (3) transmitting the data packet through a predetermined path to a destination node; and (4) making the key available to the destination node only after the destination node forwards the data packet to at least one neighboring node.

According to some embodiments, a method for enforcing forwarding of a data packet in a wireless ad hoc network, wherein the data packet has a first portion encrypted based on a key and a second portion carrying the key. The method comprises (1) receiving the data packet at a destination node at a first point in time; (2) modifying the second portion of the data packet; (3) transmitting the data packet to at least one of a plurality of intermediate nodes; (4) receiving the data packet at the destination node at a second point in time later than the first point of time; and (5) making the key available from the second portion of the data packet.

According to some embodiments, a method for enforcing data forwarding in a wireless ad hoc network. The method comprises (1) encrypting data in a data packet based on a key; and (2) transmitting the data packet from a source node to a destination node by way of a plurality of intermediate nodes connecting the source and destination nodes to provide a path for the data packet between the source and destination nodes, wherein the plurality of intermediate nodes includes the destination node.

BRIEF DESCRIPTION OF THE DRAWINGS

The drawings presented here are provided to facilitate further understanding of the present invention and constitute part of this application but are not intended to limit the present invention.

DETAILED DESCRIPTION OF THE INVENTION

Described herein is a method for solving the selfish network node problem using a context-free protocol, wherein the protocol is robust to various attacks. The protocol is a practical and robust context-free solution to discourage selfishness in wireless ad hoc networks. The methodology and design are described herein.

A. Assumptions

Firstly, since selfishness is a common problem in non-cooperative wireless networks, considered herein are general wireless ad hoc networks with selfish nodes. There is no limitation on the number of selfish nodes present in the networks and all nodes can be selfish. Secondly, considered herein are selfish behaviors but not malicious behaviors. In other words, the nodes are rational and are willing to send and receive their own data. Thirdly, provided herein are methods and systems for data forwarding but not route discovery. Lastly, a Public Key Infrastructure (PKI) system is needed as in other context-based systems.

B. Various Embodiments

According to one embodiment, the identity of a packet destination is hidden to all nodes including the intermediate nodes and the destination node, during the forwarding stage. There are two ways for a network node to find out the destination of a packet, i.e., through the identity of the last hop of a route path and through the information carried by the packet. Therefore, according to this embodiment, all information about the route and the destination should be removed from a packet and the information carried by the packet should be encrypted.

According to another embodiment, the destination node is also involved in packet forwarding and is required to forward the packet. Unlike the existing systems wherein the destination node only receives the packet but does not forward it, the destination node in this embodiment is required to forward the packet after receiving it. To make the destination node involved in data packet forwarding, a circle is constructed in the route path for the packet where the circle includes the destination node. With such setting, the destination node is required to forward the data packet when receiving the packet for the first time (i.e., a first point in time).

Figure 1:
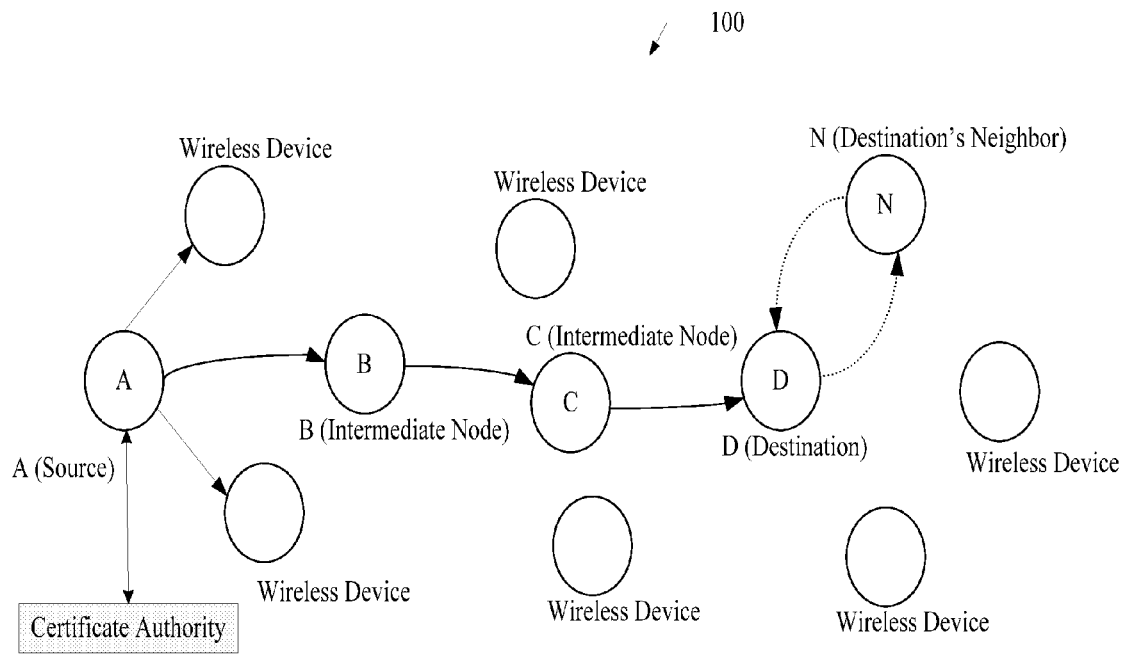
FIG. 1 depicts an exemplary network system using the COFFEE protocol where a packet is transmitted from node A to node D.

According to a further embodiment, this is achieved in a lightweight manner as depicted in FIG. 1. Specifically, when a data packet is transmitted from node A to node D through nodes B and C, a neighboring node (i.e. node N) of the destination node is determined and then a COFFEE route path is constructed as illustrated in FIG. 1. As further illustrated in FIG. 1, by redefining the original path A-B-C-D to A-B-C-D-N-D, destination node D also becomes an intermediate node and involved in forwarding the data packets. In other words, node N and destination node D are made into a loop where the data packet is forwarded from destination node D to node N and then back to destination node D. Therefore, destination node (i.e., node D) is configured to not only receive the data packet, but also forward the data packet to node N.

Figure 6:
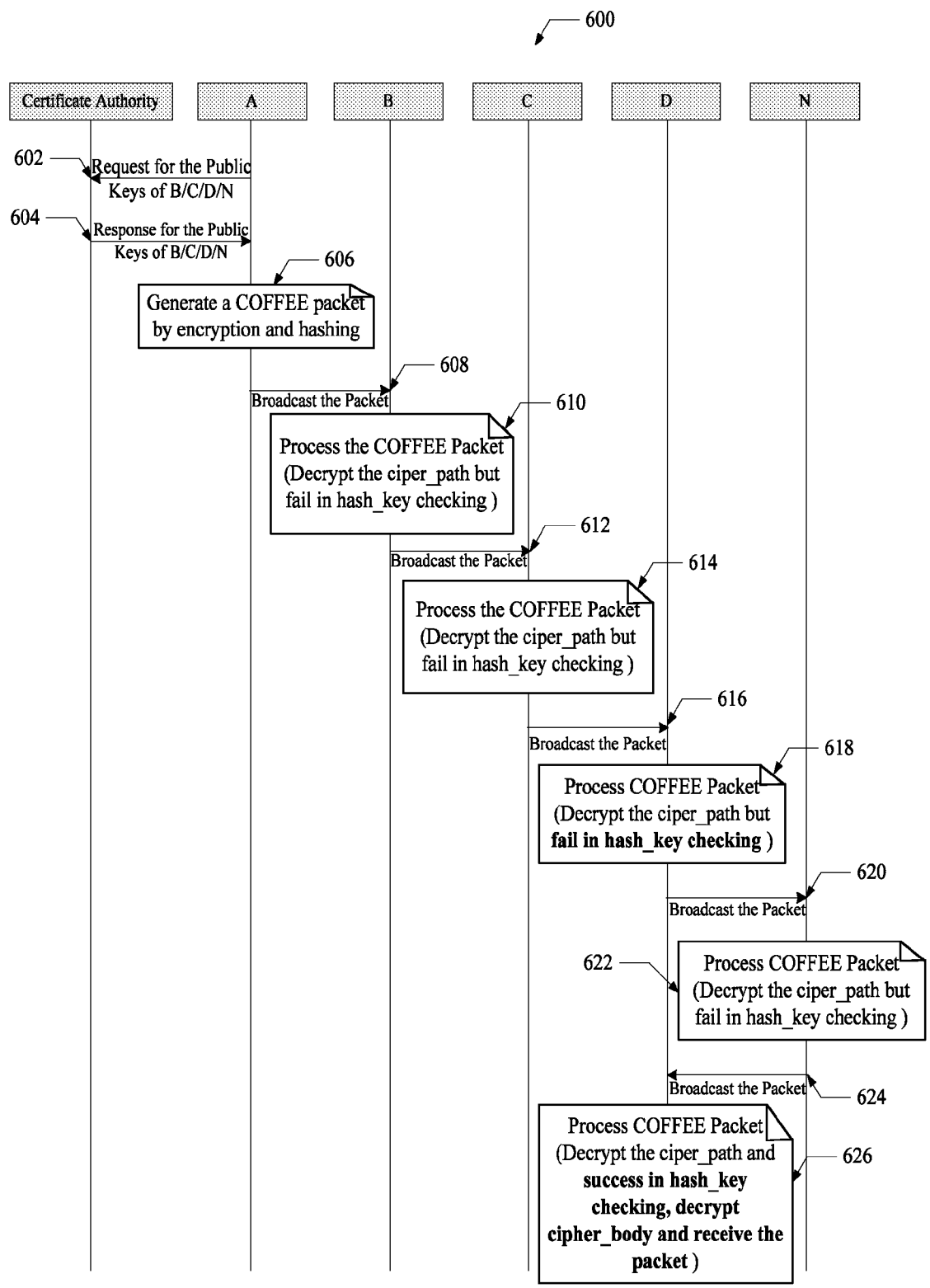
FIG. 6 depicts the inter-node operations and the information flows of the ad hoc network depicted in FIG. 1.

According to another embodiment depicted in FIG. 6, a method 600 is provided for transmitting a data packet from the source node A to the destination node D via the intermediate nodes B and C and the neighboring node N. According to the method 600, the source node A first requests from the Certificate Authority for the public keys of the destination node D, the neighboring node N, and all the intermediate nodes B and C (process 602). After the Certificate Authority responses to the request (process 604), the source node A generates a COFFEE packet according to the methods detailed below (process 606) and broadcasts the COFFEE packet onto the network 100 (process 608). When an intermediate node such as node B receives the COFFEE packet, it processes the packet by decrypting the packet header and determines that the packet transmission has not been completed yet (process 610). The intermediate node then broadcasts the packet back onto the network. When the intermediate nodes C, the destination node D, and the neighboring node N subsequently receive the packet, similar operations are carried out (processes 614-624). When the COFFEE packet is broadcast from the neighboring node N and received by the destination node the second time (process 624), the destination node D decrypts the packet header and then determines that the transmission has been completed (process 626). The destination node D then processes the data packet to retrieve the data carried in the COFFEE packet.

According to a further embodiment, the identity of the destination node can only be revealed after all nodes of a path forward the packet cooperatively.

Specifically, the destination should only be known when every step of forwarding is finished successfully. According to the embodiment, this is achieved by a properly designed data structure of the data packet, where the source node of the packet encrypts the data carried in the packet body with a public key. As depicted in FIG. 1, the public key is issued to the source node (i.e. node A) by a Certificate Authority. The Certificate Authority distributing the public key for the wireless device in ad hoc network 100 is a part of Public Key Infrastructure (PKI) that is well known to one skilled in the art. In addition, the source node encrypts the public key with a node key associated with each node in the route path in a reversed order. For example, in FIG. 1, node A (i.e., the source node) encrypts the public keys based on the node keys associated with nodes D, N, D, C, and B in this particular order. The public key is encrypted by using node D's node key, followed by node N's node key, followed by node D's node key, followed by node C's node key, then followed by node B's node key. In other words, the order of encrypting the public key using the node keys (i.e., D-N-D-C-B) is opposite to the order of transmitting the packet (i.e., B-C-D-N-D). The encrypted public key thus can and only can be open by decrypting using these nodes' keys in the order of B-C-D-N-D. This mechanism can guarantee that the data carried by the packet can only be retrieved when all nodes of the path forward the packet cooperatively, and only until then can node D knows it is the destination of the packet.

According to another embodiment, three cryptographic techniques are used in the encrypting the data: symmetric encryption/decryption, asymmetric encryption/decryption, and hash. To ease the description, several functions are defined herein: PK denotes the public key of a node, SK denotes the private key of a node, E denotes the asymmetric encryption, SE denotes the symmetric encryption, H denotes the hash function, and $E^{-1}$ and $SE^{-1}$ denote the corresponding asymmetric and symmetric decryptions.

Figure 2:
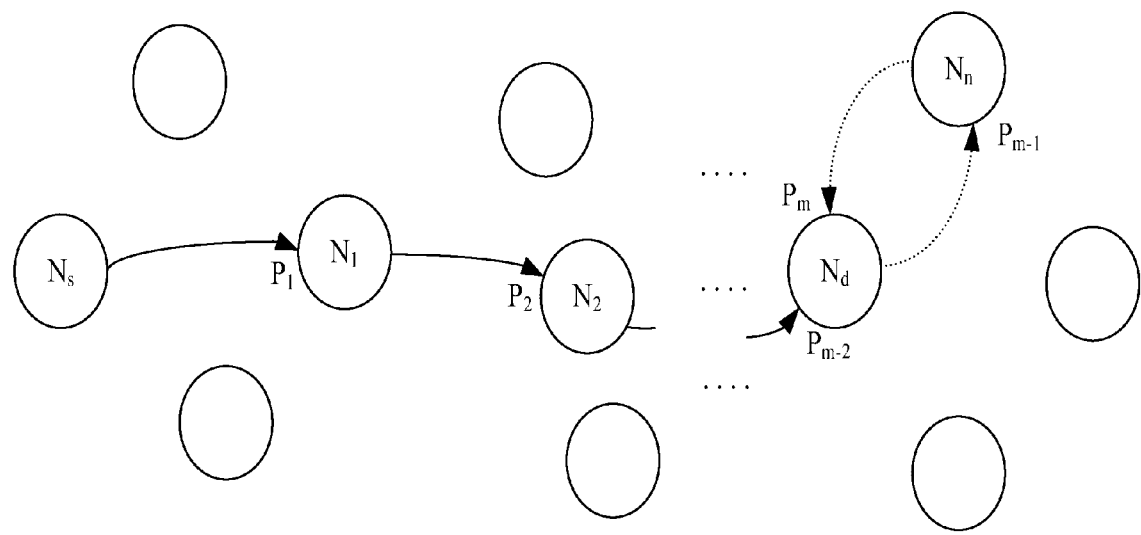
FIG. 2 depicts an exemplary network system using the COFFEE protocol where a packet is transmitted from node $N_s$ to node $N_d$.

According to another embodiment, a method for enforcing data forwarding in a general wireless ad hoc network is depicted in FIG. 2, where a data packet is transmitted from node $N_s$ to node $N_d$ via a plurality of intermediate nodes. Similar to that described in FIG. 1, at first the source node $N_s$ redefines the route path to a COFFEE path so that the destination node $N_s$ also becomes an intermediate node.

When the source node $N_s$ wants to send data to the destination node $N_d$, it acquires a route path $\{N_1, N_2, N_3, \ldots, N_d\}$ and a neighboring node $N_n$ of the destination node $N_d$. Then the transmission will be carried out along the newly constructed COFFEE path $\{N_1, N_2, N_3, \ldots, Nd, N_n, N_d\}$. For the discussion purpose, the COFFEE path is defined as:

$$P=\{p_1, p_2, \ldots, p_m\},$$

where $p_1=N_1$, $p_2=N_2$, ..., $p_{m-2}=N_d$, $p_{m-1}=N_n$, and $p_m=N_d$, as illustrated in FIG. 2. Source node $N_s$ uses the redefined COFFEE path P to transmit the data packet.

Figure 3:
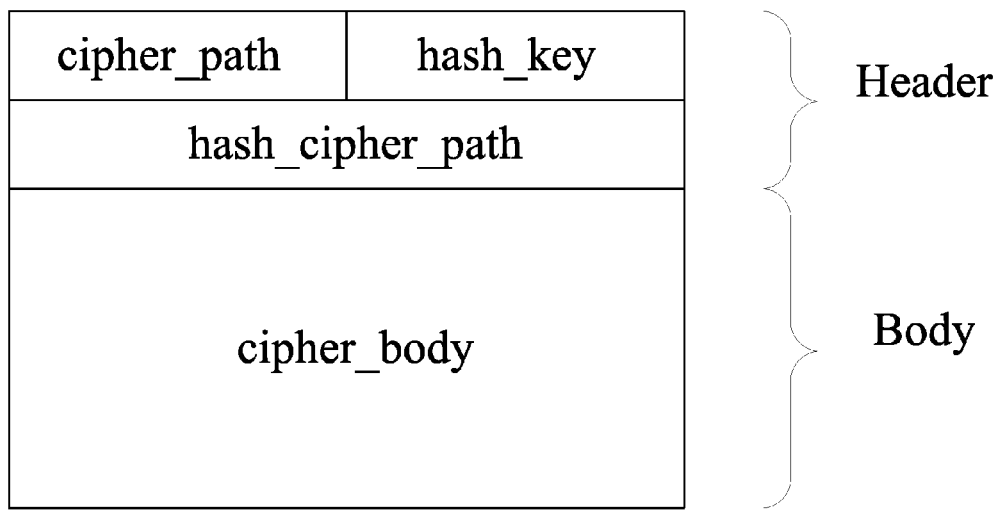
FIG. 3 depicts an exemplary packet structure according to the COFFEE protocol.

According to another embodiment, a data packet in the COFFEE protocol is sent in a special format as illustrated in FIG. 3, where a COFFEE packet includes a header portion and a body portion. The body portion stores the encrypted data cipher_body. The header portion consists of three parts: cipher_path, hash_cipher_path, and hash_key, where cipher_path is used to control transmission path, hash_cipher_path and hash_key are used for verifying the data packet.

Figure 5A:
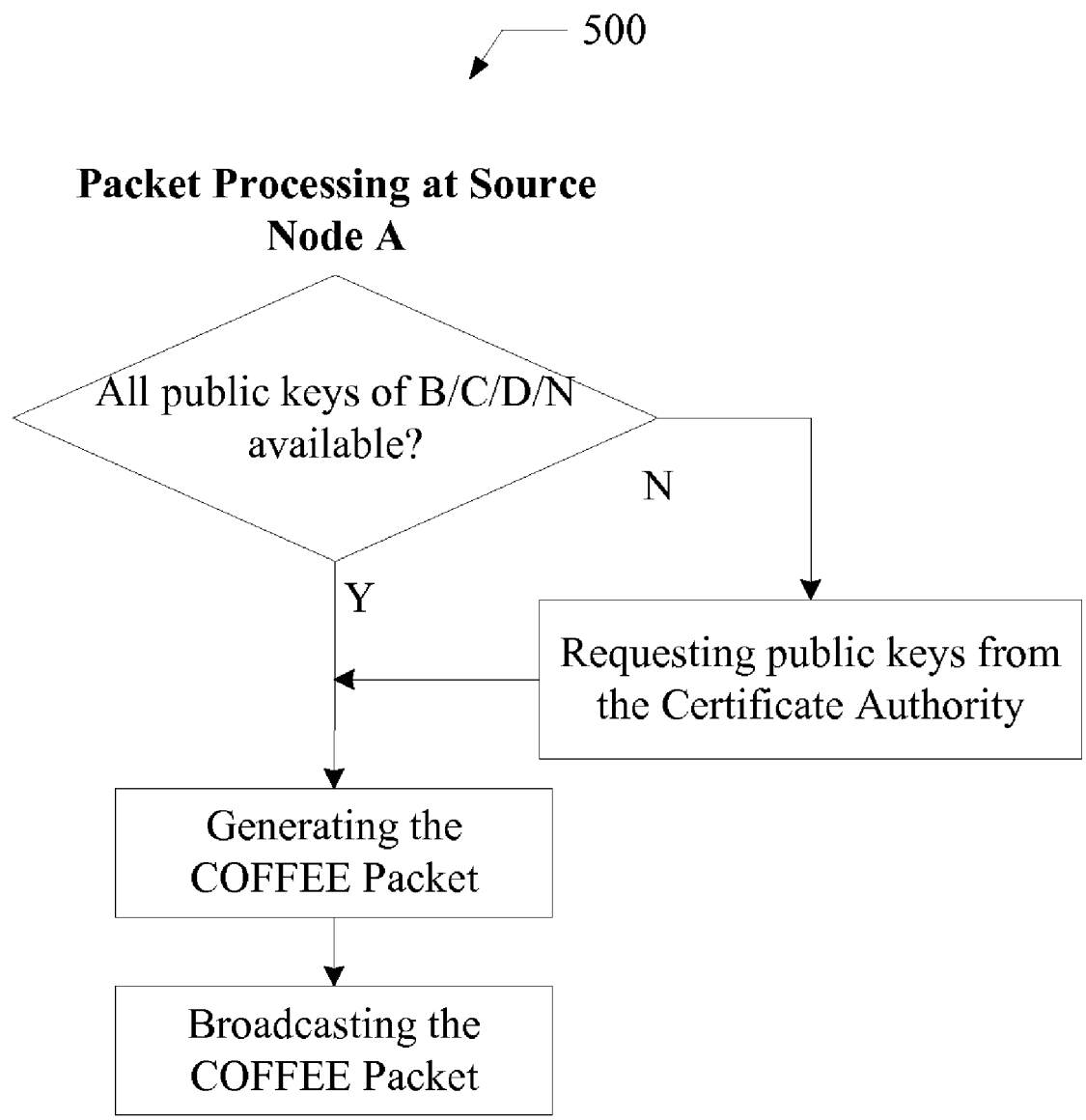
FIG. 5(a) depicts the data processing carried out at the source node according to one embodiment of the COFFEE protocol.
Figure 5B:
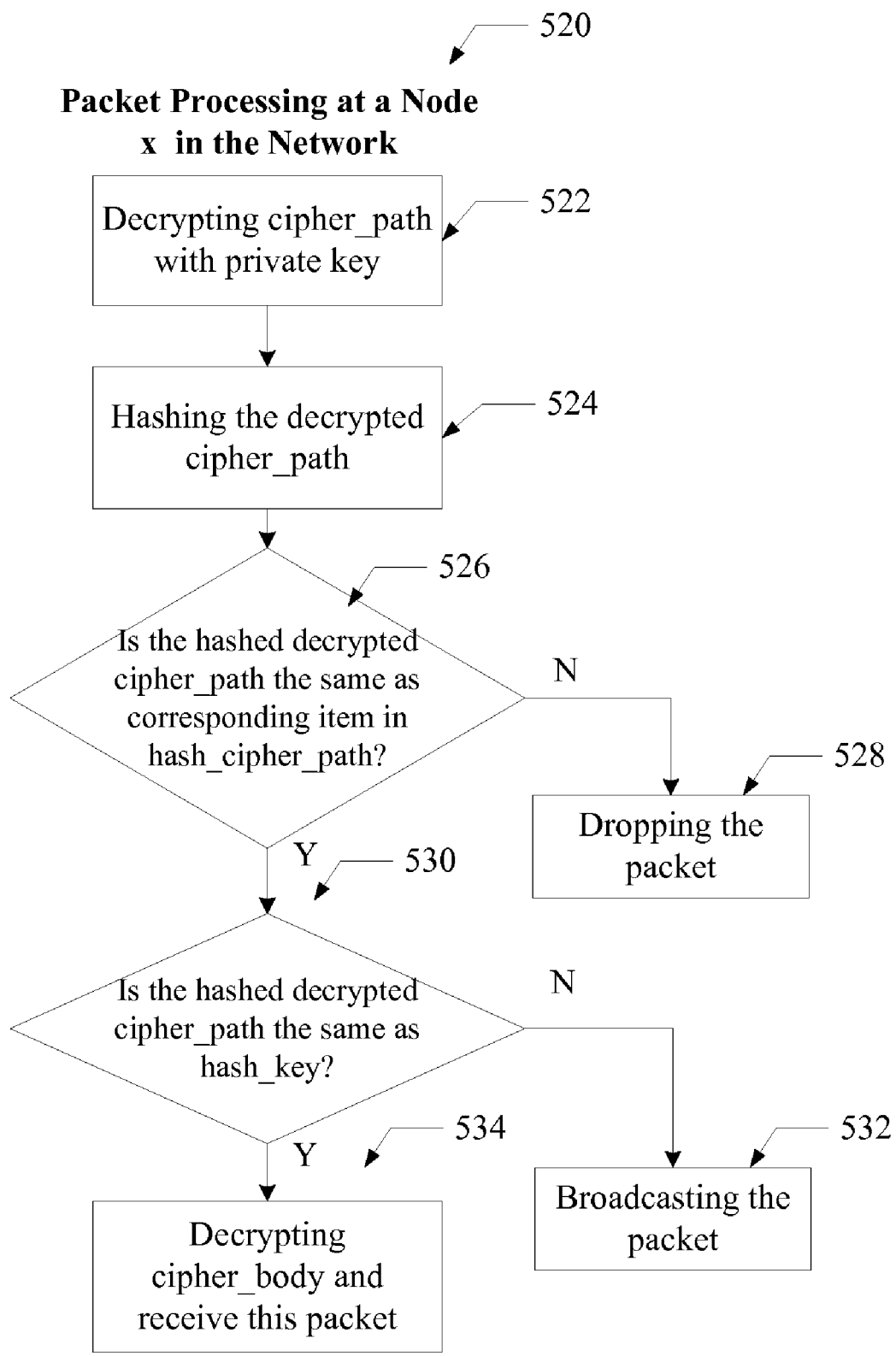
FIG. 5(b) depicts the data processing carried out at the destination node, the neighboring node, and the intermediate nodes according to another embodiment the COFFEE protocol.

According to still another embodiment depicted in FIG. 5(a), a method 500 is provide for generating and transmitting a COFFEE packet. As illustrated in FIG. 5(a), the source node (e.g., node A in FIG. 1) first determines if all of the public keys of the intermediate nodes (e.g., nodes B and C), the destination nodes (e.g., node D), and the neighboring node (e.g., node N) are available. If not all of the public keys are available, the source node the requests the public keys from the Certificate Authority. When all of the public keys become available to the source node, the source node then generates a COFFEE packet and subsequently broadcast the COFFEE packet onto the ad hoc network (e.g., network 100 in FIG. 1). The method for generating and transmitting the COFFEE packet through an ad hoc network is detailed below.

According to one embodiment, a method is provided for generating various parts of a COFFEE data packet as depicted in FIG. 3.

Specifically, to prevent intermediate nodes from estimating the data packet's destination by analyzing the packet's payload, the payload of each packet is encrypted before a transmission. To build packet body, source node encrypts the packet body with a randomly generated key K. The generated cipher_body is denoted as:

$$SE_K(M),$$

where M is the data carried by the data packet, K is the encryption key, and SE is the symmetric encryption as defined earlier.

To make the destination become available if and only if the entire transmission is completed, that is, the entire COFFEE path has been traversed by a data packet, the source node $N_s$ encrypts the encryption key K of the part of cipher_body. The encryption key K is encrypted based on keys associated with nodes in the COFFEE path in a reverse order, so that the encryption key K can and only can be decrypted when each node of the COFFEE path has forwarded the data packet sequentially from $p_1$ to $p_m$.

Specifically, the part of cipher_path is generated by the source node As as follows:

$$\text{cipher\_path}_{pm}=E_{PK(pm)}(K),$$

$$\text{cipher\_path}_{pm-1}=E_{PK(pm-1)}(\text{cipher\_path}_{pm}),$$

...

$$\text{cipher\_path}_{pi}=E_{PK(pi)}(\text{cipher\_path}_{i+1}),$$

...

$$\text{cipher\_path}_{p1}=E_{PK(p1)}(\text{cipher\_path}_{p2}).$$

The cipher_path stored in packet header transmitted by the source node $N_s$ is cipher_path$_{p1}$, which equals:

$$E_{PK(p1)}(E_{PK(p2)}(\ldots E_{PK(pm)}(K)\ldots)).$$

As the data packet is received by an intermediate node $p_i$, the intermediate node $p_i$ decrypts the part of cipher_path based on the associated node key, thereby modifying the cipher_path to an intermediate result:

$$E_{PK(pi)}(\ldots E_{PK(pi+1)}(K)\ldots)).$$

Unlike the layered encryption in existing systems used in wired networks to hide only the identity of the destination of a packet, the COFFEE protocol can adopt the layered encryption mechanism to hide not only the identity of the destination but also the next hop of a packet because of the shared media of wireless networks. As described above, the data payload of the data packet is encrypted and the encryption key K and the transmission path P are also concealed from an intermediate node. The encryption key K is not available for decrypting the data payload until the data packet traverses every node of the path or only after the destination node forwards the data packet to at least one intermediate node as depicted in FIGS. 1 and 2.

According to a further embodiment, COFFEE packets are sent by broadcasting and the hash_cipher_path is used by receiving nodes to avoid flooding. At the source node $N_s$, a hash value is generated as follows:

$$\text{hash\_cipher\_path}_{P2}=H(\text{cipher\_path}_{P2}),$$

$$\ldots$$

$$\text{hash\_cipher\_path}_{Pm}=H(\text{cipher\_path}_{Pm}).$$

And all these m−1 hash values are stored in the part of hash_cipher_path of the data packet:

$$\text{hash\_cipher\_path}_{p2},\ldots,\text{hash\_cipher\_path}_{pm}.$$

As an example depicted in FIG. 1, there are four items stored in the hash_cipher_path field. To prevent intermediate nodes from estimating the length of the route path by analyzing the hash_cipher_path field of the data packet, some redundant items are added to the tail of the field. The redundant items can be randomly generated.

According to the embodiment, every time a node receives a data packet, it decrypts the cipher_path and determines if it needs to forward this packet based on the decrypted cipher_path. Specifically, the node receiving the data packet generating a hash value from the decrypted cipher_path and compares the result with the hash_cipher_path to determine if it needs to forward this packet. If the hash value is identical to one of the value in the hash_cipher_path field, the node determines that it needs to forward the data packet the next node.

The hash_key field of the data packet includes the hash value of the encryption key K, which is used for verifying the data packet. The hash_key field is generated by the hash function denoted as:

$$H(K).$$

According to still a further embodiment, a COFFEE data packet is not directly sent to the next hop, but indirectly sent by broadcasting to all neighbors. As an example shown in FIG. 1, source node A broadcasts the data packet to all the neighboring nodes including node B on the COFFEE path as well as those wireless nodes that are not on the COFFEE path.

Figure 4:
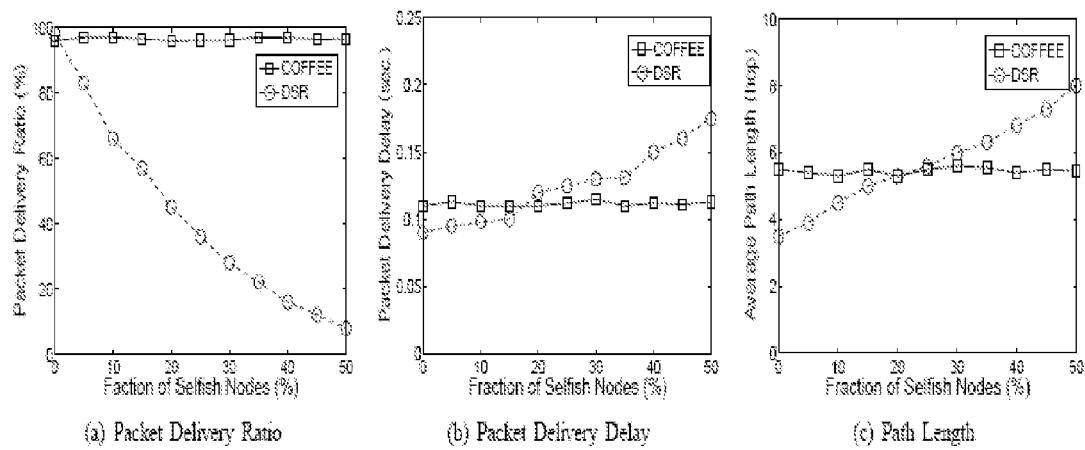
FIG. 4(a) depicts simulation results where the Packet Delivery Ratios (PDRs) are compared between the COFFEE and DSR protocols.
FIG. 4(b) depicts simulation results where the Packet Delivery Delays (PDDs) are compared between the COFFEE and DSR protocols.
FIG. 4(c) depicts simulation results where the Path Lengths are compared between the COFFEE and DSR protocols.

According to still a further embodiment depicted in FIG. 4(*b*), a method 520 is provided for processing the data packet at other nodes in the ad hoc network (e.g., network 100 in FIG. 1). After receiving the data packet, each node analyzes the packet header to determine whether it needs to further process the data packet. Specifically, when receiving a data packet, a node may open, forward, or drop it. Because the route information is hidden, some analysis is needed to make the decision.

Specifically, it is assumed that $p_{i-1}$ is the ith node of a packet's COFFEE path broadcasting the data packet and node x is one of its neighboring node. When node x receives the data packet, it decrypts the cipher_path based on its own private key SK(x) according to block 522. According to the earlier discussion, the cipher_path field of the packet before the description is:

$$E_{PK(Pm)}(K), \text{ if } p_i=p_m$$

$$E_{PK(pi)}(\text{cipher\_path}_{pi+1}), \text{ if } p_i \neq p_m$$

Accordingly, the decryption result generated by node x is:

$$K, \text{ if } x=p_i \text{ and } p_i=p_m$$

$$\text{cipher\_path}_{pi+1}, \text{ if } x=p_i \text{ and } p_i \neq p_m$$

$$\text{meaningless value, if } x \neq p_i$$

wherein $x=p_i$ indicates node x is the ith node of the COFFEE path, $pi=p_m$ indicates that the packet has arrived at its destination node and the transmission is completed, and $x \neq pi$ indicates that the packet is received by a network node not part of the COFFEE path P.

After decryption, node x further calculates a hash value of the decryption result according to block 524:

$$\text{hash\_key, if } x=p_i \text{ and } p_i=p_m$$

$$\text{hash\_cipher\_path}_{pi+1}, \text{ if } x=pi \text{ and } p_i \neq p_m$$

$$\text{meaningless value, if } x \neq p_i.$$

The hash value can be used to compare with the hash_key and the hash_cipher_path appended in the packet header. Node x then determines whether it is the right node to receive the packet according to block 526 (i.e., whether the hash result is equal to one of the items stored in hash_cipher_path.) and whether the transmission has finished according to block 530 (i.e., whether the hash result is identical to the hash_key.). Node x then performs one of the following steps according to the result of the comparison:

decrypting the packet body (block 534), if $x=p_i$ and $p_i=p_m$ forwarding the packet (block 532), if $x=pi$ and $p_i \neq p_m$ dropping the packet (block 528), if $x \neq p_i$.

When receiving a packet, all nodes follow the same steps to decide whether to retain, forward, or drop the data packet.

According to the various embodiments described earlier, the COFFEE route path is hidden from intermediate nodes and all packets are sent by broadcasting. In addition, receiving nodes processes the data packet according to the information carried in the packet header, as the packet is transmitted along the route path.

C. Stimulating Data Forwarding

According to the embodiments described above, when a packet is sent:

(1) The packet body is encrypted and cannot be opened without a key (i.e. the encryption key K). Moreover, the initial path is redefined to a COFFEE path so that the destination node is also required to forward the data packet.

(2) No routing information is provided in the packet. The receiving node doesn't know the destination or where to send the packet. Thus, it merely forwards the data packet by way of broadcasting it.

(3) The identity of the destination node and the key of packet body can only be known after the transmission is finished.

With these mechanisms, every node thinks it may be the one to which the packet is destined, so they are all willing to forward the packet.

As the embodiment depicted in FIG. 1, after receiving the data packet and analyzing the packet header, node B knows that it is one of the nodes on the route path of the packet, node B, however, cannot decrypt the packet body since the hash value generated from the decryption result does not match the hash_key carried in the packet header. Node B then determines that the transmission of the packet is not finished yet. But it is still possible that node B is the destination of the packet, so node B will not simply drop the packet, and will in turn broadcast the packet to its neighboring nodes including node C.

When the packet is transmitted to nodes C and D, the data packet is processed similarly. Specifically, although node D is the destination of the data packet, when the data packet is broadcasted from node C to node D (i.e., the data packet reaching node D at the first point in time), the encryption key K is not yet available to node D. This is because after node D decrypts the cipher_path of the packet based on its own key, the encryption key K at this point is still encrypted as:

$$E_{PK(N)}(E_{PK(D)}(K))$$

Therefore, when node D compares the hash value of $E_{PK(N)}(E_{PK(D)}(K))$ with the cipher key carried by the packet header, it discovers that they are not identical and therefore determines that the transmission of the data packet is not yet completed. Node D, however, will not drop the packet since according to the COFFEE protocol, it is possible that the data packet is destined to node D. As node D compares the hash value of $E_{PK(N)}(E_{PK(D)}(K))$ with those items stored in the hash_cipher_path field of the packet header, it finds that the hash value of $E_{PK(N)}(E_{PK(D)}(K))$ is identical to one of the items and determines that it is on the COFFEE path of the data packet. Consequently, node D again broadcasts the data packet onto the network.

Similarly, as node N receives the packet from D, it broadcasts the packet onto the network according to the COFFEE protocol. Specifically, since the encryption key K remains encrypted, node N is unable to determine the destination of the packet and thinks that it is possible that the data packet is destined to itself. Because the information about the next hop of the packet is not available to the intermediate nodes, all data packets provided by the COFFEE protocol are sent by broadcasting. Accordingly, node N processes the packet header and broadcasts the data packet as do other intermediate nodes.

When the data packet is received by node D at a second point in time later than the first point in time described earlier, the transmission is finished since the encryption key K is now only encrypted by the node key of node D as $E_{PK(D)}(K)$. After the key K is decrypted from the cipher_path field of the data packet, node D compares the hash value of the decryption result and the hash_key and determines that the packet has reached its destination successfully, thereby retaining the data packet.

As described above, before the transmission of the data packet is completed, all intermediate nodes are willing to cooperate even if all of them intend to be selfish. The destination node of the data packet is unable to determine that the data packet is destined to itself until it broadcasts or forwards the data packet to at least one of its neighboring node. Only after the destination node forwards the data packet out to other nodes, the encryption key K becomes available for decrypting the packet body.

The above description is merely intended to be exemplary embodiments; one skilled in the art will readily understand that other configurations of the path and the packet structure are possible after reading the specification. For example, the data packet may traverse more than one node between being received by the destination D at the first point in time and at the second point in time. In other words, the COFFEE path may include more than one intermediate node between the destination node D in the first place and the destination node D in the second place. One skilled in the art, however, will readily recognize that such a configuration will causes more network traffics and a longer transmission time of the data packet than the configuration described herein.

In addition, although the various embodiments described herein utilize a symmetric encryption to encrypt the packet body and an asymmetric encryption to encrypt the encryption key K, one skilled in the art will readily recognize that other encryption schemes can also be implemented in these embodiments. For example, the packet body and the encryption key K can both be encrypted based on the symmetric or asymmetric encryption. Alternatively, the packet body can be encrypted based on the asymmetric encryption, while the encryption key K may be encrypted based on the symmetric encryption.

D. Preventing Packet Dropping

Stimulating data forwarding focuses on maximizing the number of successful transmissions, while preventing packet dropping focuses on minimizing the number of failed transmission.

Packet dropping causes data loss and retransmission, therefore a small number of packet dropping can cause serious consequences.

All context-based solutions have troubles with preventing packet dropping because of various defects. For reputation-based solutions, it is hard to tell the difference between selfishly packet dropping and accidental events. According to the existing systems, it is still safe for a selfish node to drop a carefully controlled number of packets. Though the benefit is not very significant for a node, but the impact could be significant for the entire network. The problem of credit-exchange based solutions is much more significant than that of the reputation-based solutions. In credit-exchange based solutions, nodes are paid to help forward packets. As a result it is safe to drop packets in some condition. For example, a node may use a greedy way to save its energy: never earn too much unnecessary credits, and drops incoming packets if the credits are enough for use. This can cause serious problem if many nodes are such type of intelligent selfish nodes.

As a context-free solution, the COFFEE protocol has none of these problems. When a packet is received by a node, if it is determined that the transmission is not finished yet, then it is still possible that the node is the destination of the packet, and a piece of its data may be lost if the node drops the packet. Therefore, every node on the transmission path is willing to cooperate in forwarding the data packet and no node will intentionally drop the packet. As a result, the COFFEE protocol can both stimulate data forwarding and prevent packet dropping very effectively. It is a significant advantage over the context-based solutions.

E. Benefits of the COFFEE Protocol

The COFFEE protocol is independent of any historical information, thus it is totally stateless and context-free, which is a fundamental difference from the existing methods and systems. The benefits of the COFFEE protocol are detailed as follows:

1) No Measurement is Needed: Measurements are usually done by neighboring nodes' over hearing the network activities. However, because congestion is common in wireless networks, it is hard to identify the reason of a packet dropping event. Context-based schemes are based on measurements of nodes' behaviors and packets' transmissions, thereby causing various problems such as high complexity and inaccuracy. Moreover, some protocols require nodes to exchange measurement results and therefore cause the problem of ensuring trusts among nodes.

As a context-free protocol, the COFFEE protocol operates in an entirely different way and doesn't rely on network measurements at all, therefore it has none of the problems associated with the existing systems and methods.

2) Simplicity and Lightweight: When implementing an existing protocol, the network system usually becomes extremely complex as a large number of inputs are required and a great deal of data is maintained in the system. For example, the reputation-based schemes require neighboring nodes of every node to measure its behaviors, so they require the inputs of measurement results. And they also need to maintain the data of every node's reputation in the network. As another example, in credit-exchange schemes, a node pays other nodes if they help forward its packets, so the paying node needs to keep track the status of a packet's transmission. Therefore, these schemes require the input of measurement results of packets' transmissions. And they also need to maintain data of every node's current credits.

Unlike these methods and systems, the COFFEE protocol only needs one extra input, i.e., a neighboring node of the destination node, and doesn't need to maintain any extra data. The system is more lightweight and can be easily implemented in a wide array of networks and systems.

3) Security: All context-based schemes need to maintain context data and always bring new security problems: the security of storing, updating, and exchanging context data.

The COFFEE protocol, however, has no such security problems as it does not rely on any context information. As a context-free protocol, the COFFEE protocol solves the problem of selfish behaviors in the level of one packet's transmission. Therefore, the COFFEE protocol doesn't need to maintain context information, and causes no security problems.

4) Zero Warm-up Time: Context-based schemes need time to generate enough context information to operate effectively, whereas the COFFEE protocol is a context-free protocol and doesn't need extra time to warm-up.

In reputation-based schemes, when forwarding packets, a node needs enough reputation information to avoid the selfish ones. In credit-exchange schemes, a node needs time to earn enough credits to send its own data. So they both can not take effect immediately. The COFFEE protocol, however, doesn't need any extra historic information to function, therefore can take effect immediately.

The requirement for warm-up time also means context-based schemes cannot work well for short term transmissions, such as, in transmissions that occur in a time shorter than the warm-up time required by the context-based schemes. In contrast, the COFFEE protocol can work with any traffic patterns, even when there is only one packet to transmit in the entire network.

5) Preventing Packet Dropping: Packet dropping leads to serious problems such as data losses and excessive retransmissions. So it is very important to prevent abnormal packet dropping in wireless networks.

Both reputation-based and credit-exchange schemes cannot effectively prevent packet dropping. Firstly, at the measurement stage, it is hard to differentiate packet dropping caused by congestions from those caused by selfishness of the network nodes, so it is safe for a node to drop a carefully controlled small portion of packets. Secondly, in credit-exchange schemes, when a node gets enough credits to send its own data, it is safe for that node to drop all packets as long as the credits remain at the adequate level.

The COFFEE protocol, however, can completely prevent packet dropping caused by selfishness of network nodes. As described above, in the COFFEE protocol every intermediate node has the motivation to forward every received packet as the every intermediate node is the potential destination of the data packet.

F. Collusion Resistance

The COFFEE protocol has the built-in ability to resist any form of colluding cheat. In the COFFEE protocol, a data packet is encrypted based on a secret key. Then the key is encrypted by a layered encryption mechanism. The key and the destination can only be known or made available after the transmission is finished. It is therefore impossible for a colluding node to find out the destination node or the secret key until the entire transmission of a data packet is completed.

G. Resistance to Flow Analysis

The COFFEE protocol is robust to flow analysis. That's because the route path information is also concealed in every COFFEE packet. When a node receives a packet, it only knows where the packet comes from, but does not know where it should go. So a node can only get one-hop information but is not able to analyze the flow. For example, when a node receives a sequence of packets from one of its neighboring node, it is not able to tell if all packets are going to a same downstream node therefore is not able to determine if these packets belong to the same traffic flow.

F. Making Use of Selfish Nodes

Whenever a node intends to be selfish, the existing solutions will partially or totally isolate it. Such method is inefficient, because an ad hoc network rely on enough nodes that are well connected. In the COFFEE protocol, no matter a node intends to be selfish or not, the source nodes can utilize them to assist data transmissions. Thus, all nodes including both selfish and honest nodes are used to support transmissions. Unlike the methods that isolate selfish nodes, a network using the COFFEE protocol can be better connected and provide better route paths, which will be shown by the simulation results described hereinafter.

The performances of the COFFEE protocol are described in two aspects: the network performance and the computational complexity.

G. Network Performance

With respect to the network performance, the COFFEE protocol is shown to improve on the packet delivery ratio, the packet delivery delay, and the length of route path when compared with existing methods.

1) Simulation Metrics

The performance of the COFFEE protocol is evaluated based on the following metrics:

Packet Delivery Ratio (PDR): The average fraction of data packets sent by the source node that are received by the destination node.

Packet Delivery Delay: The average time for a packet to reach its destination.

Path Length: The average number of hops for packets to traverse to destinations.

2) Simulation Setting:

The network performance is studied with the widely used Network Simulator (NS-2). The simulator parameters are described in Table I.

TABLE I

SIMULATION PARAMETERS

| Parameter | Value |
|---|---|
| Mac Protocol | IEEE 802.11 DCF |
| Channel Bit Rate | 2 Mbps |
| Radio Range | 250 m |
| Radio Propagation Model | Two-Ray Ground |
| Routing Protocol | DSR |
| Source Agent | CBR |

In the simulations the original DSR is chosen as our base case and compared with the COFFEE protocol. Because selfish nodes in DSR cause infinite packet delivery delay, we modify DSR to avoid the selfish nodes when testing the packet delivery delay and the path length. The network is set to be a typical wireless ad hoc network as described in Table II. Every simulation run lasts 60 seconds and each simulation is repeated 100 times.

3) Simulation Results:

a) Packet Delivery Ratio (PDR)

FIG. 4(a) shows how many packets can reach their destinations under different faction of selfish nodes. When there are no selfish nodes in the network, the PDR of both the COFFEE protocol and the DSR protocol are about 96%. However, with the increase of fraction of selfish nodes, the PDR of the DSR protocol drops quickly but the PDR of the COFFEE protocol remains around 96%. Hence, the COFFEE protocol does not cause significant degradation of the PDR and is able to sustain a high PDR in selfish environments.

TABLE II

NETWORK PARAMETER

| Parameter | Value |
|---|---|
| Network Area | 1000 m × 1000 m |
| Number of Nodes | 50 |
| Speed of Nodes | 5 m/s |
| Data Flows | 10 |
| Packet Size | 1024 bytes |
| Packet Rate | 2 packets/second | b) Packet Delivery Delay

FIG. 4(b) shows that although the COFFEE protocol causes a slightly larger packet delivery delay (i.e., about 0.02 second) when there is no selfish nodes, when more than 20% nodes in the network are selfish, the DSR protocol costs much longer delay. This is because selfish nodes in DSR paths can make those paths unavailable, thereby breaking short paths and resulting in a larger overall average packet delivery delay.

c) Path Length

FIG. 4(c) depicts the internal reason of the variation of packet delivery delay shown in FIG. 4(b). When there are no selfish nodes, the average route path of the COFFEE protocol is about 2 hops longer than the DSR protocol, this is consistent with the definition of COFFEE paths. However, when 20% nodes are selfish, some short route paths are broken in the DSR protocol and the average length of available route path significantly increases.

In conclusion, the COFFEE protocol significantly outperforms the DSR protocol as the fraction of selfish nodes increases.

H. Computational Complexity

In the COFFEE protocol, three cryptographic techniques are used: asymmetric encryption, symmetric encryption, and hash. Their computational workloads are analyzed.

Nowadays symmetric encryption and hash can be implemented very efficiently, but asymmetric encryption is still inefficient. In a COFFEE packet as depicted in FIG. 3, only the cipher_path is encrypted based on the asymmetric encryption and the hash_key and hash_cipher_path are generated by hashing, and cipher_body is encrypted based on the symmetric encryption. This design minimized the usage of the asymmetric encryption/decryption.

The Crypto++ Library is widely used and its benchmark can be used to analyze the COFFEE protocol's computational complexity. This library is coded in C++, compiled with the whole program optimization, and ran on an Intel Core 21.83 GHz processor. The hardware of ad hoc network nodes may vary, and the benchmark is sampled. The RSA chosen as the asymmetric cryptographic algorithm, the DES as the symmetric cryptographic algorithm, and the SHA-1 as the hash algorithm. The time complexity of these algorithms is shown in Table III.

TABLE III

CRYPTO++ LIBRARY BENCHMARK

| Operation | Time (ms) |
|---|---|
| DES | $2.94 \times 10^{-5}$ per byte |
| RSA 1024 Encryption | 0.07 per operation |
| RSA 1024 Decryption | 1.52 per operation |
| SHA-1 | $6.45 \times 10^{-6}$ per byte |

The benchmark shows that the RSA cost much more time than DES. To improve the performance of the asymmetric encryption/decryption, two kinds of solutions can be used. The first employs a more efficient signature scheme. The second one employs the symmetric cryptography instead of the asymmetric cryptography. A traditional approach is to build a public key system, in which every node obtains a public-key certificate and then uses its public key to obtain a new symmetric key. The following two solutions are considered for the purpose of analyzing the computational complexity:

RSA+DES+SHA1: the RSA is used as the asymmetric cryptography technique, the DES as the asymmetric cryptography technique, and the SHA-1 as the hashing technique. One skilled in the art would recognize that this configuration requires more computational power.

DES+DES+SHA1: As an alternative, a symmetric cryptography technique may be used to replace the asymmetric cryptography technique as described above. For example, the DES is used to replace the RSA to improve the performance.

To study the computational complexity of the COFFEE algorithm, it is assumed that the length of a COFFEE Path is n, the size of the packet body (i.e. data payload) is $s_b$, the complexity of the asymmetric encryption/decryption is $t_{ae}/t_{ad}$, the complexity of the symmetric encryption/decryption is $t_{se}/t_{sd}$, and the complexity of the hash function is $t_h$. When generating a COFFEE packet, the time used to generate the cipher_path is $n \times t_{ae}$, the time to generate the hash_key is $s_k \times t_h$, where $s_k$ is the size of the encryption key of encrypting the packet body, the time used to generate the hash_cypher_path is $(n-1) \times s_k \times t_h$, the time used to generate the encrypted packet body is $s_b \times t_{se}$. So the total time used by the source node for generating a packet is:

$$n \times t_{ae} + n \times s_k \times t_h + s_b \times t_{se}.$$

Similarly the time used by each intermediate node for analyzing the packet header is:

$$t_{ad} + s_k \times t_h.$$

The time used by the destination node for processing the packet is:

$$2 \times t_{ad} + 2 \times s_k \times t_h + s_b \times t_{sd}.$$

And the total time used by all nodes for transmitting and processing a packet is:

$$n \times (t_{ae} + t_{ad} + 2 \times s_k \times t_h) + s_b \times (t_{se} + t_{sd}).$$

In an exemplary embodiment, it is assumed that n is equal to 6, $s_b$ is equal to 1024 bytes, and $s_k$ is equal to 128 bytes. The time complexities of the COFFEE protocol are shown in Table IV. It is shown that when using the RSA+DES+SHA1 solution, the bottleneck is at the destination node, whose workload is 3.07 ms/packet, equivalently 326 KB/s. It also shows that when using the DES+DES+SHA1 solution, the bottleneck is at the source node, whose workload is 0.035 ms/packet, equivalently 28.6 MB/s.

TABLE IV

TIME COMPLEXITY OF CRYPTOGRAPHIC OPERATIONS

| | Time (ms) | |
| --- | --- | --- |
| Solution | RSA + DES + SHA1 | DES + DES + SHA1 |
| Source Node | 0.46 | 0.035 |
| Intermediate Node | 1.52 | 0.001 |
| Destination Node | 3.07 | 0.031 |
| Total | 9.6 | 0.07 |

After reading these description, one skilled in the art will readily recognize that the DES+DES+SHA1 solution has a much lower computational complexity that the RSA+DES+SHA1 solution, and the RSA+DES+SHA1 solution can be greatly improved by appropriate modifications that are readily understood by one skilled in the art.

The preferred embodiments of the present subject matter and a few examples of its versatility are shown and described in the present disclosure. It is to be understood that the present subject matter is capable of use in various other combinations and environments and is susceptible of changes and/or modifications within the scope of the inventive concept as expressed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for enforcing data forwarding in a wireless ad hoc network, the method comprising:
    encrypting, by a processor, data in a data packet based on a packet key;
    encrypting the packet key based on a plurality of node keys, corresponding to a plurality of nodes;
    transmitting the data packet with the encrypted packet key through a predetermined path to a destination node; and
    making the packet key available to the destination node only after the destination node forwards the data packet to at least one neighboring node, so as to enable the destination node to decrypt the data in the data packet encrypted by the packet key.

2. The method of claim 1, wherein the predetermined path includes a plurality of intermediate nodes and the at least one neighboring node, and wherein the packet key is a symmetric key and the plurality of node keys are public keys.

3. The method of claim 2, wherein the data packet includes a first portion for carrying the encrypted data and a second portion for carrying the packet key encrypted based on the plurality of node keys.

4. The method of claim 1, wherein encrypting the packet key based on a plurality of node keys further comprises:
encrypting the packet key based on the plurality of node keys in an order opposite to the order through which the plurality of corresponding nodes are traversed during the transmission of the data packet through the predetermined path.

5. The method of claim 3, further comprising modifying the second portion of the data packet at each node in the predetermined path based on one of the plurality of node keys.

6. The method of claim 1, further comprising:
applying a node key to the encrypted packet key at the at least one neighboring node; and
wherein making the packet key available comprises applying another node key to the encrypted packet key.

7. The method of claim 5, wherein the step of modifying the second portion of the data packet further comprises:
generating a decryption result by decrypting the second portion of the data packet based on one of the plurality of node keys; and
storing the decryption result in the second portion of the data packet.

8. The method of claim 7, wherein the data packet includes a third portion for carrying a pre-calculated hash value, and the method further comprises:
generating a hash value from the decryption result; and
determining that the hash value is not identical to the pre-calculated hash value.

9. The method of claim 3, wherein the data packet includes a third portion for carrying a pre-calculated hash value, and the method further comprises:
decrypting, at the destination node, the data packet using the packet key;
generating a hash value from the decrypted data packet; and
determining that the hash value is identical to the pre-calculated hash value.

10. A method for enforcing forwarding of a data packet in a wireless ad hoc network, wherein the data packet has a first portion encrypted based on a key and a second portion carrying the key, the method comprising:
receiving the data packet at a destination node at a first time;
modifying, by a processor, the second portion of the data packet;
transmitting the data packet to at least one of a plurality of intermediate nodes;
receiving the data packet at the destination node at a second time later than the first time; and
determining, at the destination node, the key from the second portion of the data packet so as to enable the destination node to decrypt the first portion of the data packet.

11. The method of claim 10, wherein before receiving the data packet at the destination node at the second time, the data packet has traversed a predetermined path including the plurality of intermediate nodes and the destination node, and wherein the key is encrypted based on a plurality of node keys, each of the plurality of node keys being associated with one of a plurality of intermediate nodes and the destination node.

12. The method of claim 11, wherein before the destination node transmits the data packet to at least one of the plurality of intermediate nodes, the method further comprises:
generating, by the destination node, a decryption result from the second portion of the data packet based on a node key associated with the destination node;
calculating, by the destination node, a hash value from the decryption result;
determining, by the destination node, that the hash value is not identical to a pre-calculated hash value stored in the data packet; and
storing, by the destination node, the decryption result in the second portion of the data packet.

13. The method of claim 11, wherein after the destination node receives the data packet at the second time, the method further comprises:
generating, by the destination node, a decryption result from the second portion of the data packet based on a node key associated with the destination node;
calculating, by the destination node, a hash value from the decryption result; and
determining, by the destination node, that the hash value is identical to a pre-calculated hash value stored in the data packet.

14. The method of claim 11, wherein the plurality of intermediate nodes and the destination node of the predetermined path are arranged in a predetermined order and wherein the key is encrypted based on the plurality of node keys in a reverse order with respect to the predetermined order.

15. A method for enforcing data forwarding in a wireless ad hoc network, the method comprising:
encrypting data in a data packet based on a key;
transmitting the data packet with the key from a source node to a destination node by way of a predetermined path including a plurality of intermediate nodes, wherein the predetermined path includes transmission of the data packet with the key from the destination node to at least one neighboring node and transmission of the data packet back to the destination node after the transmission of the data packet with the key from the destination node to the at least one neighboring node; and
decrypting the data in the data packet at the destination node based on the key after the data packet has been transmitted through the predetermined path.

16. The method of claim 15, further comprising encrypting the key in the data packet based on a plurality of node keys, wherein each of the plurality of node keys is associated with one of the plurality of intermediate nodes and the destination node.

17. The method of claim 16,
wherein the key is encrypted based on the plurality of node keys in a reverse order with respect to the predetermined path.

* * * * *